(12) United States Patent
Wendt et al.

(10) Patent No.: US 10,668,770 B2
(45) Date of Patent: Jun. 2, 2020

(54) MOTOR VEHICLE WHEEL BEARING ASSEMBLY

(71) Applicant: Aktiebolaget SKF, Gothenburg (SE)

(72) Inventors: Volker Wendt, Uechtelhausen/Zell (DE); Padelis Katsaros, Schweinfurt (DE); Dominique Shah, Bad Koenigshofen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 285 days.

(21) Appl. No.: 15/632,918

(22) Filed: Jun. 26, 2017

(65) Prior Publication Data
US 2017/0368870 A1 Dec. 28, 2017

(30) Foreign Application Priority Data
Jun. 28, 2016 (DE) .................. 10 2016 211 640

(51) Int. Cl.
*B60B 27/00* (2006.01)
*B60B 27/02* (2006.01)

(52) U.S. Cl.
CPC ........ *B60B 27/001* (2013.01); *B60B 27/0078* (2013.01); *B60B 27/02* (2013.01); *B60B 27/0094* (2013.01); *B60B 2360/104* (2013.01); *B60B 2360/106* (2013.01); *B60B 2360/141* (2013.01); *B60B 2360/144* (2013.01); *B60B 2900/111* (2013.01); *B60B 2900/112* (2013.01); *Y02T 10/86* (2013.01)

(58) Field of Classification Search
CPC .... B60B 27/00; B60B 27/0005; B60B 27/001
See application file for complete search history.

(56) References Cited

U.S. PATENT DOCUMENTS

| | | | | | |
|---|---|---|---|---|---|
| 2,349,220 | A | * | 5/1944 | Eksergian | B60B 27/02 301/105.1 |
| 3,724,907 | A | * | 4/1973 | Housel | B60B 27/02 301/105.1 |
| 5,100,247 | A | * | 3/1992 | Woehler | B60B 27/0005 384/544 |
| 7,134,732 | B1 | * | 11/2006 | Spokane | B60B 5/02 301/106 |
| 7,419,226 | B2 | * | 9/2008 | Jenkinson | B60B 3/147 301/105.1 |
| 2015/0108826 | A1 | * | 4/2015 | Nervo | B60B 5/02 301/105.1 |

* cited by examiner

*Primary Examiner* — Jason R Bellinger
(74) *Attorney, Agent, or Firm* — Garcia-Zamor Intellectual Property Law, LLC; Ruy Garcia-Zamor; Bryan Peckjian (57) ABSTRACT

A motor vehicle wheel bearing assembly includes a hub configured to be supported by at least one rolling-element bearing and to provide a seat for a wheel. The hub includes a first hollow-cone-shaped element manufactured from light metal and having a first axial end section having a first diameter and a second axial end section having a second, larger, diameter and at least one bearing raceway or raceway support at the first axial end section. The hub also includes a second element extending radially from an end of the first hollow-cone-shaped element, the second element having a radially inner section and a radially outer section. The second axial end section of the first element is connected to the radial outer section of the second element, for example, at a joint.

21 Claims, 8 Drawing Sheets

MOTOR VEHICLE WHEEL BEARING ASSEMBLY

CROSS-REFERENCE

This application claims priority to German patent application no. 102016 211 640.1 filed on Jun. 28, 2016, the contents of which are fully incorporated herein by reference.

TECHNOLOGICAL FIELD

The disclosure relates to a motor vehicle wheel bearing assembly, comprising a hub part supported using at least one rolling-element bearing, which hub part includes a seat for a wheel.

BACKGROUND

It is known in the prior art to form a hub part (a "hub") of a motor vehicle wheel bearing assembly entirely from light metal; aluminum is usually used for this purpose. Advantageously such a solution is relatively light. However, such a lightweight construction of a wheel bearing assembly, in particular for trucks—manufactured completely from aluminum—has the disadvantage that a one-piece casting always requires a core. A relatively large amount of material is required for the core in order to realize the bearing position under the screw-on flange for the rim.

If the light metal, in particular the aluminum, were disposed in the radially outer region of the hub, the material utilization would be better. However, this is not possible with the previously known solutions due to the required shaping of a wheel bearing hub.

The manufacturing method of previously known light-metal solutions is furthermore problematic. Up to now only one design is chosen for this, which requires a high light-metal volume and undercutting, which in terms of tool technology also requires that relatively complex cores must be worked with in the tool or during casting.

SUMMARY

An aspect of the disclosure is therefore to further develop a motor vehicle wheel bearing assembly of the above-mentioned type that can be realized in a simple manner with pressure die casting with rapid cooling. Preferably only two simple tool halves should be required. Here furthermore a fine metal structure should arise. Also envisaged is an easy and cost-effective manufacturability, in particular with regard to the preparing of a greater number of variants.

One exemplary solution of this problem is a hub part ("hub") including:
- a first hollow-cone-type shaped element manufactured from a light metal, which includes a first axial end section having a first diameter and a second axial end section having a second, larger diameter, and
- a second element extending in the radial direction including a radially inner and a radially outer section,
- wherein the axial end section of the first element having the larger diameter is connected to the radial outer section of the second element.

Here the first element is preferably comprised of aluminum or magnesium. The second element is preferably comprised of steel plate, grey cast iron, aluminum, or magnesium.

The connection between the first element and the second element can be comprised of a beading, wherein a radially outer-lying section of the second element is laid over the first element.

For fixing the wheel on the seat a number of attaching screws are preferably used, wherein these penetrate both the first and the second elements, preferably in the axial direction.

To design the first element, which is shaped like a "funnel," it can have a constant radial thickness at least over 70% of its axial extension. However, the second element preferably has a constant wall thickness over its entire extension.

In the region of its first axial end section having the smaller diameter, the first element can include a seat surface for a rolling-element bearing (a "raceway support") or directly a raceway for rolling elements. Accordingly the second element can include in its radially inner-lying region a seat surface for a rolling-element bearing or directly a raceway for rolling elements.

According to a further development a number of attachment points can be formed on the first element for the purpose of connecting the first and second elements, to which attachment points the second element is attached using a number of attachment screws.

According to the present disclosure a simply constructed connecting unit thus arises, in particular for a truck wheel bearing.

The disclosure involves a type of funnel construction made from aluminum (first element) that initially lacks the bearing support (second element) on the rim-flange side. This "funnel" (first element) is then supplemented with a thin-walled bearing shield (second element) in order to produce a volume-optimized composite construction.

This bearing support (second element) attached to the aluminum funnel (first element) can be manufactured from aluminum, from steel plate, from grey cast iron, or from another material.

The proposed solution is characterized by various advantages:

Firstly, it is true that the high thermal expansion of the aluminum of the first element is only effective on a bearing seat if the other bearing seat (second element) is comprised of an iron material. Thus the bearing setting can be maintained in a narrower range than is provided in the case of a purely light-metal hub. The bearing design can thereby more easily be kept at an optimum than is possible in the case of a purely light-metal hub.

A pure die casting with higher cooling speeds in comparison to a casting with sand cores in undercuts also cools more quickly and advantageously generates a finer-grain structure and thus a higher-strength component.

Furthermore, the proposed solution offers an easier adaptability to different variants: different first and second elements can be produced and these can then be combined with each other into the composite part. A better realization possibility of a correspondingly wider range of variants thus arises.

By imposing the bearing shield (second element) over the aluminum rim flange (first element) its higher material-dependent thermal expansion can be controlled well. A simple attaching possibility is provided by a beading or flanging.

Exemplary embodiments of the disclosure are depicted in the drawings.

DETAILED DESCRIPTION

Figure 1:
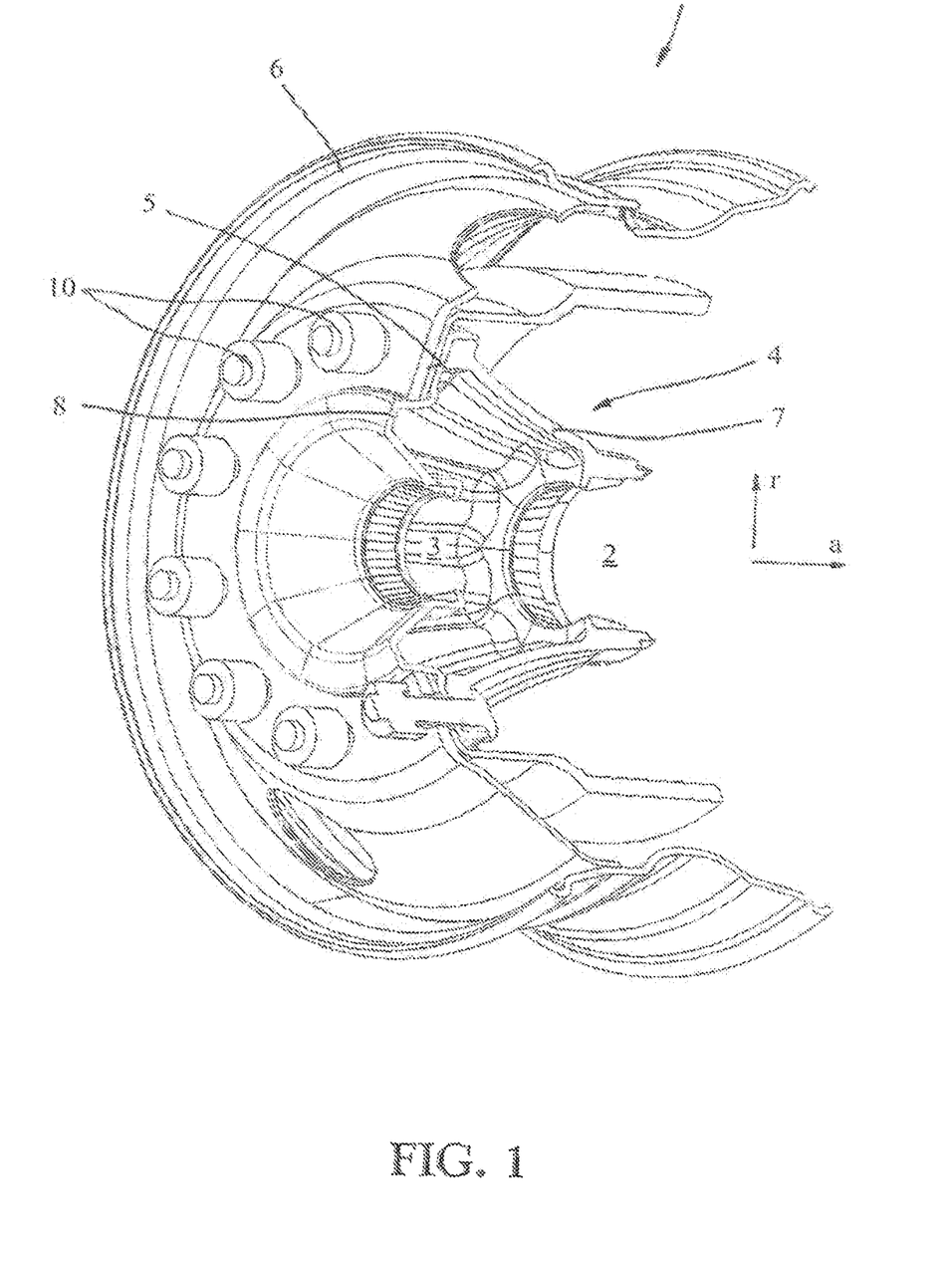
FIG. 1 is a perspective view of a motor vehicle wheel bearing assembly, partly in section, seen from a first viewing direction.
Figure 2:
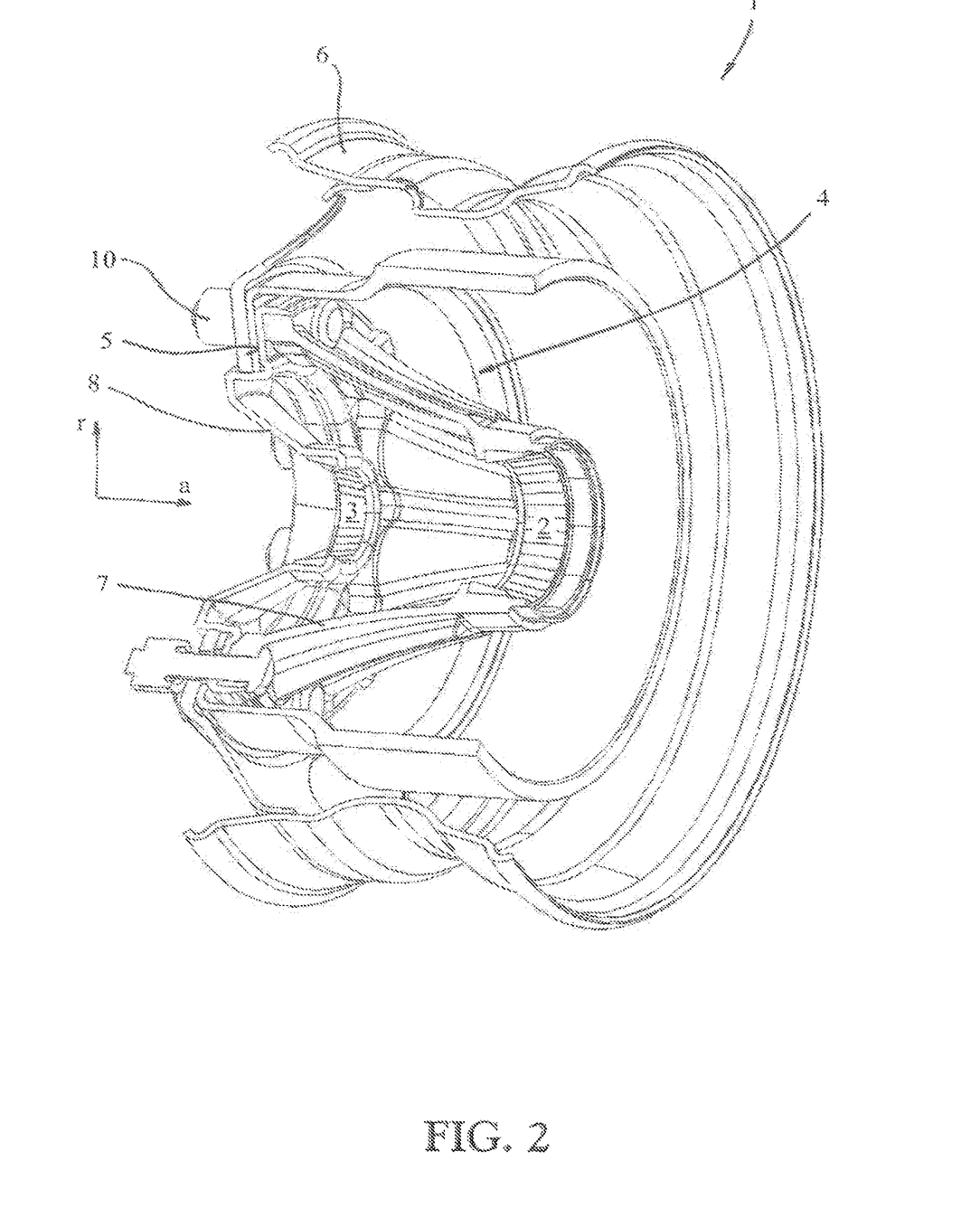
FIG. 2 is a perspective view of the motor vehicle wheel bearing assembly according to FIG. 1, viewed from a second viewing direction.
Figure 3:
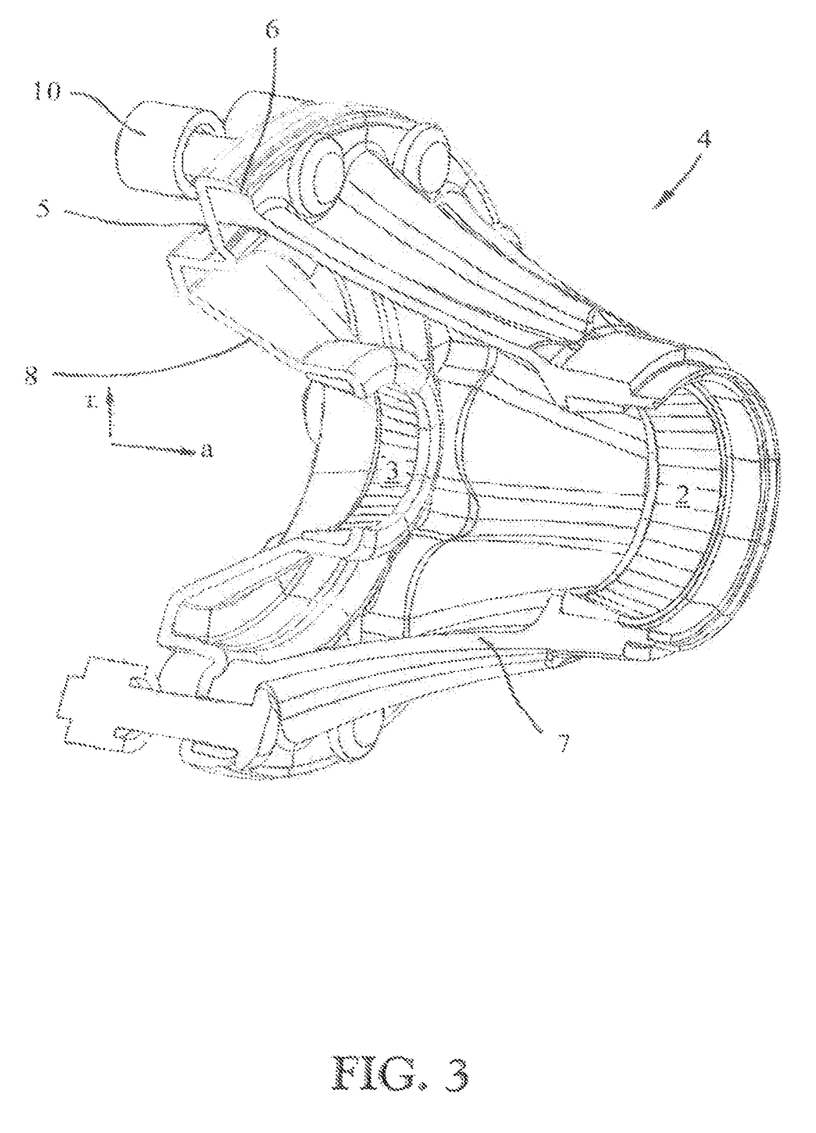
FIG. 3 is a perspective view of the motor vehicle wheel bearing assembly according to FIG. 2 without the wheel mounted.

A motor vehicle wheel bearing assembly 1 or parts thereof is shown in the Figures. In the FIGS. 1 and 2 the complete motor vehicle wheel bearing assembly 1 is sketched, depicted in sectional view, and includes locations for receiving two rolling-element bearings, only the outer raceways 2 and 3 of which are illustrated. It is preferred to use two tapered roller bearings preloaded against each other. The rolling element bearings are disposed in a central region in order to rotatably support a hub part 4. The hub part 4 includes a seat 5 for a wheel 6, which wheel 6 can be releasably fixed on the hub part 4 using attachment screws 10.

In this case the design of the hub part 4 is essential. It includes a first element 7 that is produced from light metal, in this case from aluminum. The first element here has essentially the shape of a hollow cone, i.e., it is designed essentially funnel-shaped. Accordingly a first axial end section has a first (small) diameter and a second axial end section has a second (large) diameter. Furthermore, the hub part 4 has a second element 8 extending in the radial direction, which element 8 has a radially inner section and a radially outer section. The axial end section of the first element 7 having the larger diameter is connected here to the radially outer section of the second element 8.

Various details concerning this are illustrated in the further Figures. Orientation of the motor vehicle wheel bearing assembly 1 or parts thereof is referenced by an axial direction a and a radial direction r as identified in each of the Figures. A location 2a for receiving the rolling-element bearing 2 and a location 3a for receiving the rolling-element bearing 3 are identified in FIGS. 4-8 to provide a reference to orientation of the elements illustrated.

Figure 4:
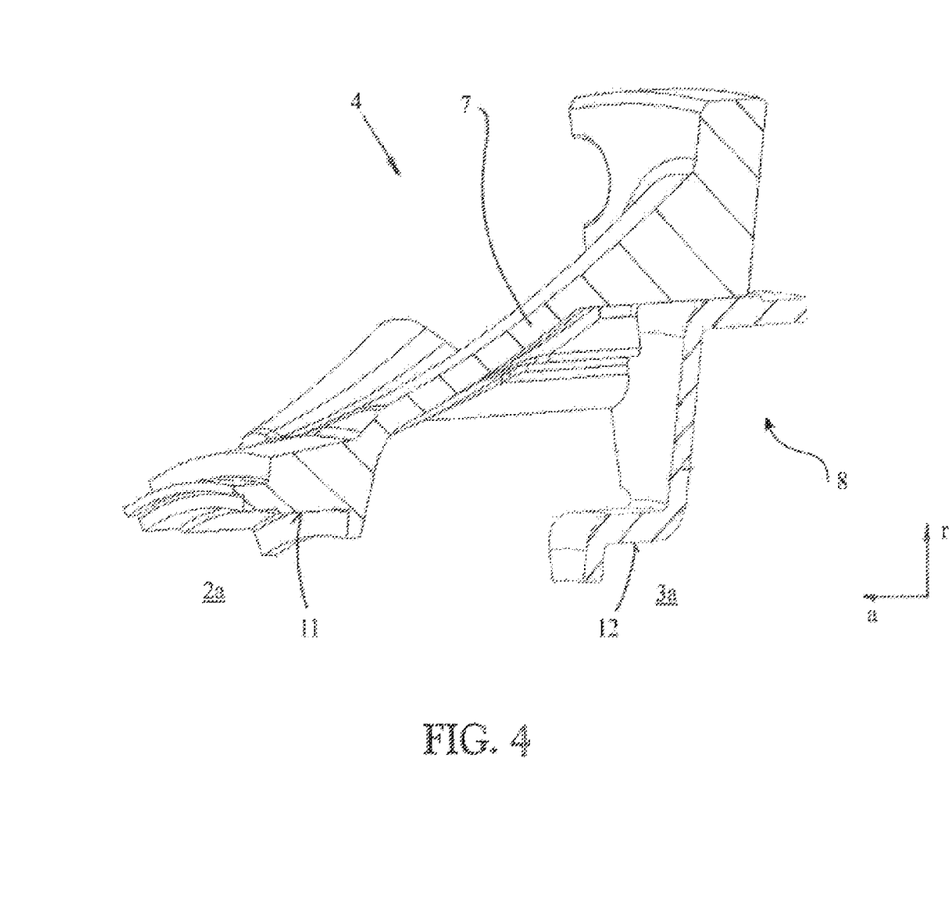
FIG. 4 is a perspective view in of the hub part of the motor vehicle wheel bearing assembly, shown in section, according to a possible embodiment of the disclosure.

In FIG. 4 it can be seen that the two elements 7 and 8 can be connected to each other via a press fit. The two elements 7 and 8 can also be connected to each other via an interference fit, for example, using a beading or flanging as described below.

Figure 5:
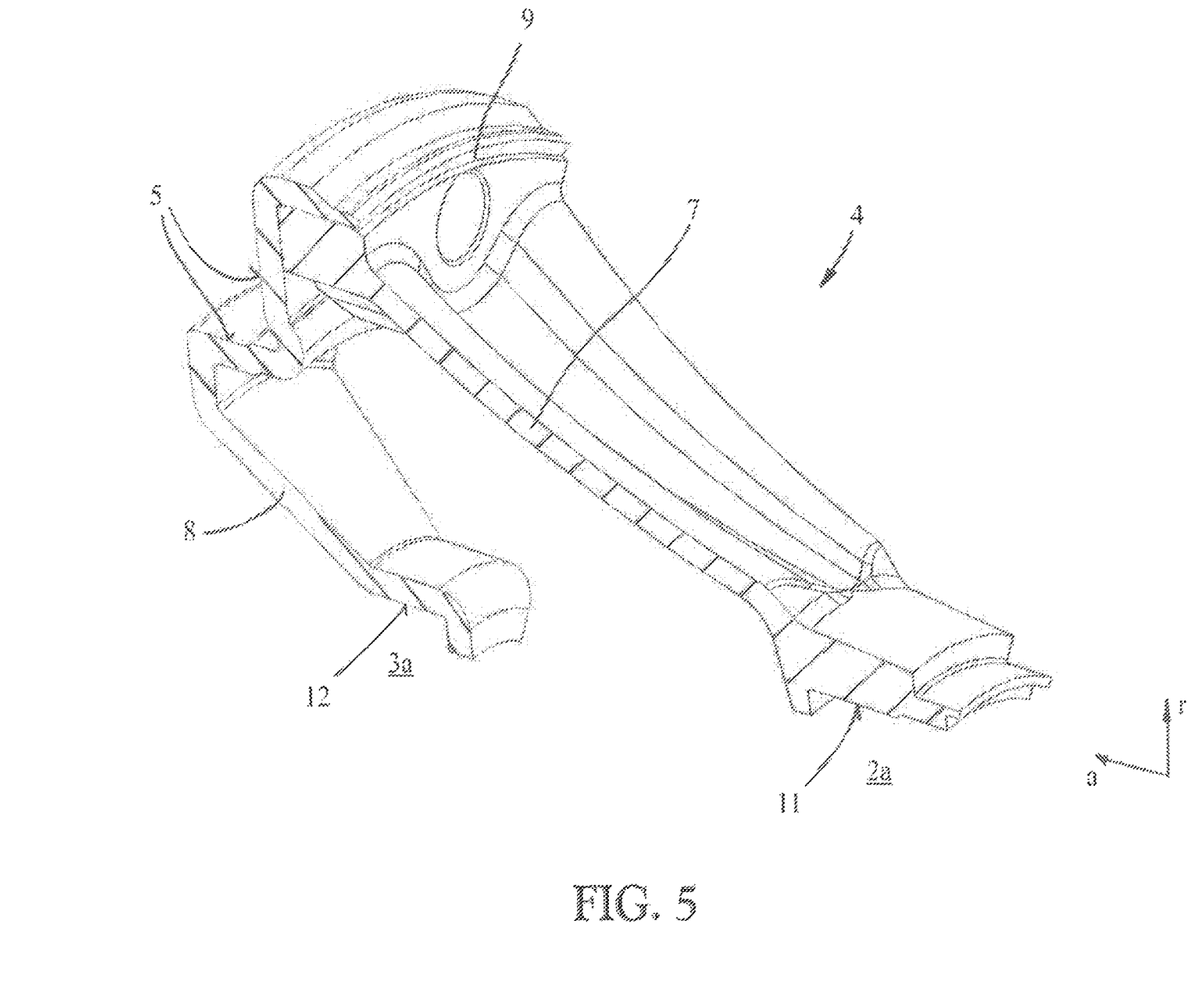
FIG. 5 is a perspective view from the hub part of the motor vehicle wheel bearing assembly, shown in section, according to another possible embodiment of the disclosure.
Figure 6:
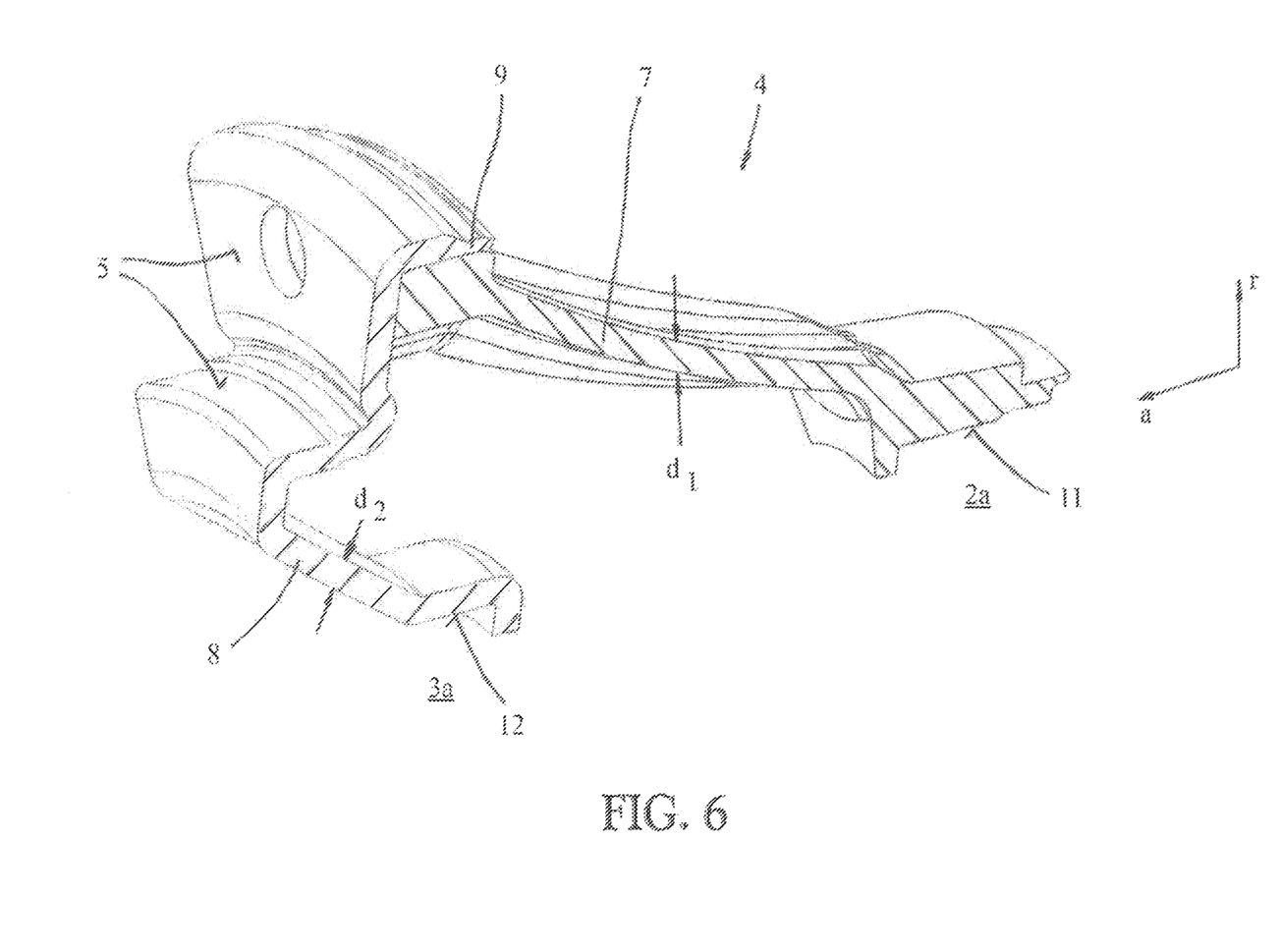
FIG. 6 is the view of FIG. 5 viewed from a second viewing direction.

However, in FIGS. 5 and 6 it can be seen that the connection between the two elements 7 and 8 is achieved using a bead 9, wherein a radially outer-lying part of the second element 8 engages the axial end section of the first element 7 having the larger diameter, and the two elements 7 and 8 are connected to each other by deforming (beading or flanging).

Figure 7:
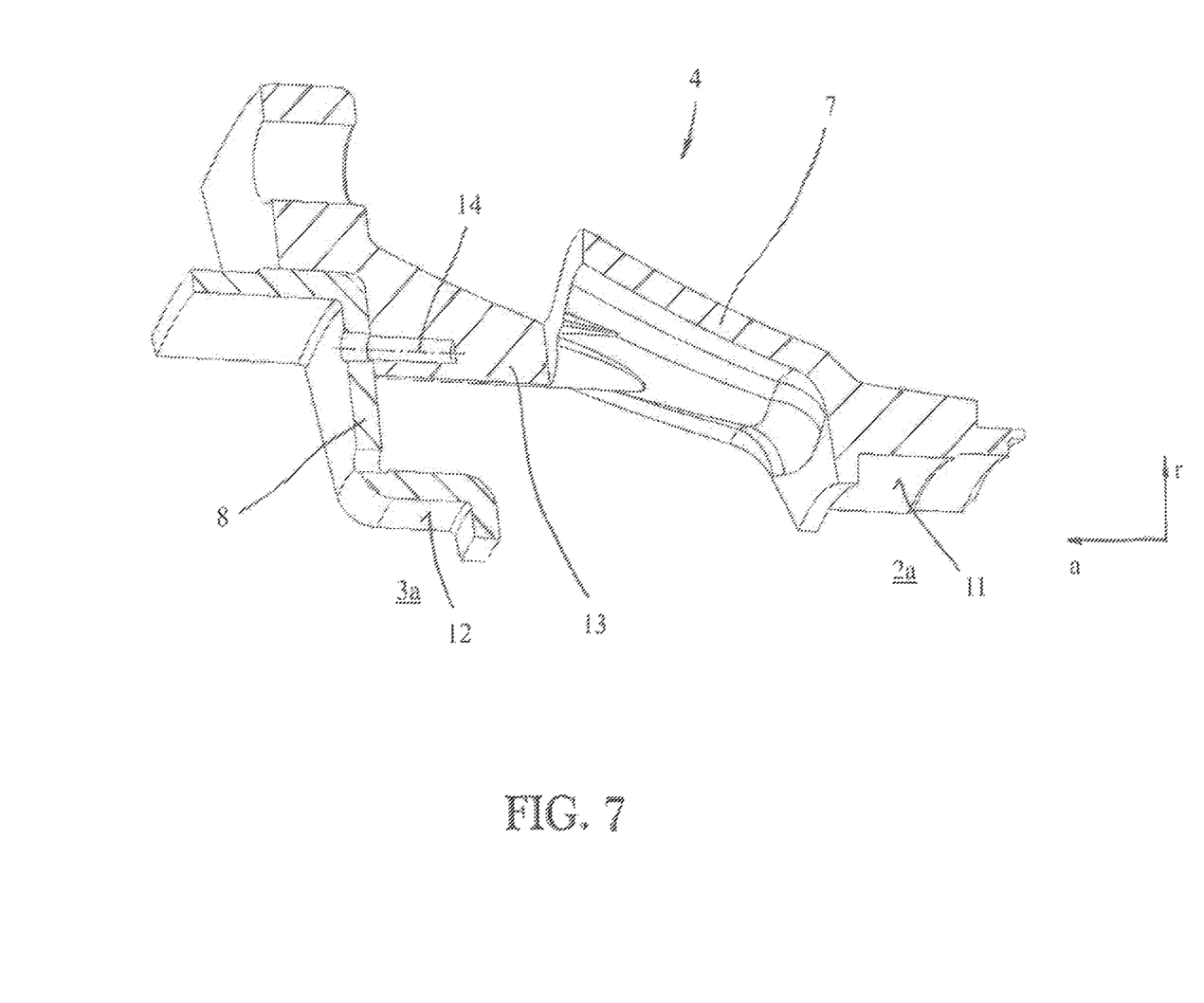
FIG. 7 is a perspective view from the hub part of the motor vehicle wheel bearing assembly, shown in section, according to another possible embodiment of the disclosure.
Figure 8:
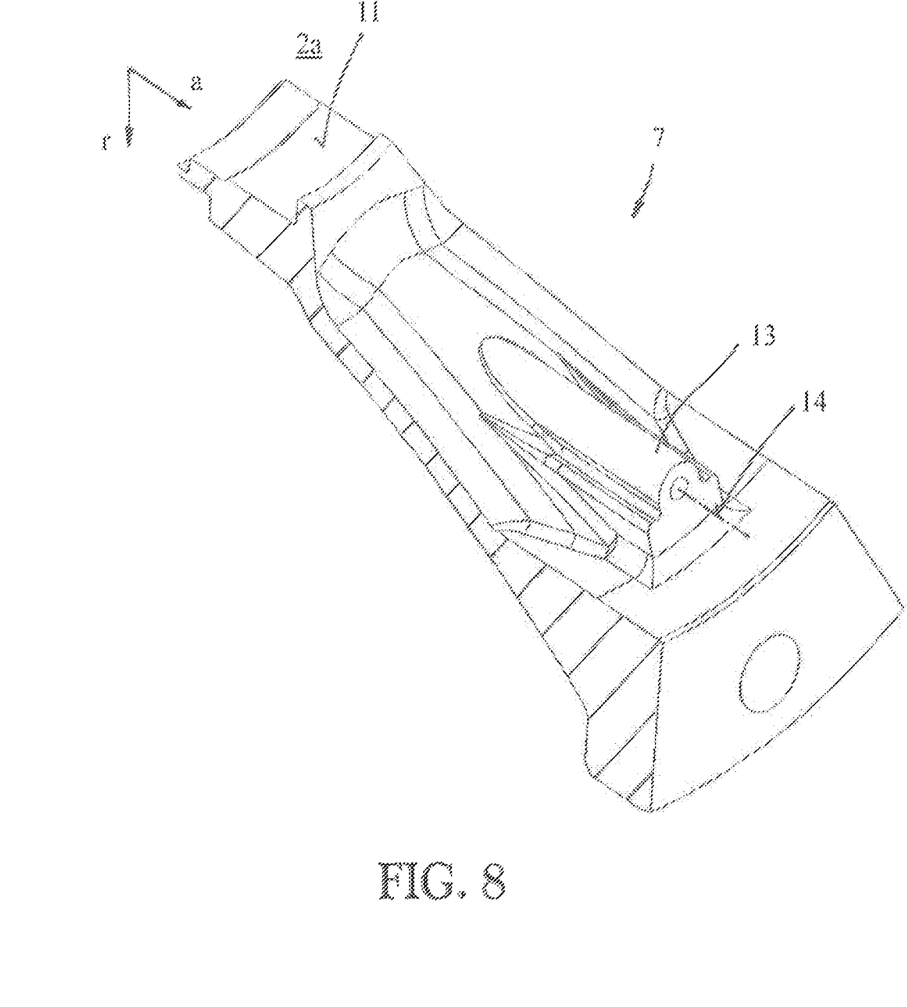
FIG. 8 is a perspective view, in section, from the one part (first element) of the hub part of the motor vehicle wheel bearing assembly according to FIG. 7.

In FIGS. 7 and 8 yet another solution is illustrated: here block-type attachment points 13 are formed as well on the first element 7, on which block-type attachment points 13 the second element 8 is applied (see FIG. 7), and both elements 7 and 8 are connected to each other using attachment screws 14.

Of course, the mentioned connection measures can also be used in combination in order to connect the two elements 7 and 8 to each other.

As further follows from the Figures, the first element 7 includes in the region of its small diameter a seat surface 11 serving as a raceway support for the rolling-element bearing 2; alternatively this region can also be directly formed to function as raceway for the rolling-element bearing 2.

In an analogous manner the second element 8 has a seat surface 12 serving as a raceway support for the rolling-element bearing 3 in its radially inner-lying region; in turn instead of a seat for the bearing ring the raceway of the rolling-element bearing can also be directly provided here.

Finally it can also be seen that the first element 7 has an essentially constant radial thickness di over major parts of its axial extension a (see FIG. 6). However, the second element 8 has an essentially constant wall thickness d2 over its entire extension.

Overall a stable but light construction results for the motor vehicle wheel bearing assembly 1 as is preferably used in trucks.

Material usage is optimized since in particular the difficult-to-manufacture or -cast light metal is disposed precisely at the locations where it is needed.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved motor vehicle wheel bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

Ref No. Description
1 Motor vehicle wheel bearing assembly
2 Rolling-element bearing
2a Location for receiving the rolling-element bearing (2)
3 Rolling-element bearing
3a Location for receiving the rolling-element bearing (3)
4 Hub part
5 Seat
6 Wheel
7 First element (funnel)
8 Second element
9 Beading
10 Attachment screw
11 Seat surface for a rolling-element bearing/raceway for rolling elements
12 Seat surface for a rolling-element bearing/raceway for rolling elements
13 Attachment point
14 Attachment screw
r radial direction
a axial direction
$d_1$ radial thickness
$d_2$ wall thickness

What is claimed is:

1. A motor vehicle wheel bearing assembly including a hub configured to be supported by at least one rolling-element bearing and to provide a seat for a wheel, wherein the hub comprises:
a first hollow-cone-shaped element manufactured from a light metal and having a first axial end section having a first diameter and a second axial end section having a second, larger, diameter and at least one bearing raceway or raceway support at the first axial end section, and
a second element extending radially from an end of the first hollow-cone-shaped element, the second element having a radially inner section and a radially outer section,
wherein the second axial end section of the first element is connected to the radial outer section of the second element.

2. The motor vehicle wheel bearing assembly according to claim 1, wherein the light metal is aluminum or magnesium.

3. The motor vehicle wheel bearing assembly according to claim 2, wherein the second element is formed from steel plate or grey cast iron.

4. The motor vehicle wheel bearing assembly according to claim 2, wherein the second element is aluminum or magnesium.

5. The motor vehicle wheel bearing assembly according to claim 1, wherein the connection between the first element and the second element is an interference fit including a beading or a flange extending over a portion of the first element.

6. The motor vehicle wheel bearing assembly according to claim 1, wherein the first element and the second element include aligned through openings configured to receive attachment screws for attaching a wheel to the second element.

7. The motor vehicle wheel bearing assembly according to claim 1, wherein the first element has a constant radial thickness ($d_1$) at least over 70% of an axial extension of the first element.

8. The motor vehicle wheel bearing assembly according to claim 1, wherein the second element has a constant wall thickness ($d_2$) over an entire course of the second element.

9. The motor vehicle wheel bearing assembly according to claim 1, wherein the first element first axial end section is the bearing raceway.

10. The motor vehicle wheel bearing assembly according to claim 1, the radially inner section of the second element further including a seat surface, wherein the seat surface is configured to receive a rolling-element bearing or to form a raceway for rolling elements.

11. The motor vehicle wheel bearing assembly according to claim 1, wherein a number of attachment points are formed on the first element, wherein the second element is attachable to the attachment points using a number of attachment screws.

12. The motor vehicle wheel bearing assembly according to claim 2,
wherein the second element is steel plate or grey cast iron,
wherein the connection between the first element and the second element is a joint that includes a beading, and wherein a radially outer-lying section of the second element extends over the first element,
wherein the first element and the second element include aligned through openings configured to receive attachment screws for attaching a wheel to the second element,
wherein the first element has a constant radial thickness ($d_1$) at least over 70% of an axial extension of the first element,
wherein the second element has a constant wall thickness ($d_2$) over an entire course of the first element, and
wherein the second element includes a seat surface in the radially inner section, the seat surface being configured to receive a rolling-element bearing or to form a raceway for rolling elements.

13. A motor vehicle wheel bearing assembly including a hub configured to be supported by a first rolling-element bearing and a second rolling-element bearing and to provide a seat for attachment to a wheel, the hub comprising:
a first element having a shape of a hollow cone and being formed from aluminum or magnesium, the first element having a first circular opening having a first diameter at a first axial end and a first bearing raceway supported by the first circular opening or formed in an inner wall of the first circular opening and a second axial end section having a second diameter greater than the first diameter, and
a second element extending radially inwardly from the second axial end section of the first element, the second element having a radially inner section having a second circular opening and a second bearing raceway supported by the second circular opening or formed in an inner wall of the second circular opening, the second element having a radially outer section,
wherein the second axial end section of the first element is connected to the radial outer section of the second element at a joint, and wherein the radially outer section of the second element forms the seat.

14. The motor vehicle wheel bearing assembly according to claim 13, wherein the second element is one of steel plate or grey cast iron.

15. The motor vehicle wheel bearing assembly according to claim 13, wherein the second element is one of aluminum or magnesium.

16. The motor vehicle wheel bearing assembly according to claim 12, wherein the connection between the first element and the second element is one of a press fit or an interference fit.

17. The motor vehicle wheel bearing assembly according to claim 12, wherein the first element and the second element include aligned through openings configured to receive attachment screws for attaching a wheel to the second element.

18. The motor vehicle wheel bearing assembly according to claim 12, wherein a number of attachment points are formed on the first element, to which attachment points the second element is attachable using a number of attachment screws.

19. The motor vehicle wheel bearing assembly according to claim 13, wherein the connection between the first element and the second element is one of a press fit or an interference fit.

20. The motor vehicle wheel bearing assembly according to claim 13, wherein the first element and the second element include aligned through openings configured to receive attachment screws for attaching a wheel to the second element.

21. The motor vehicle wheel bearing assembly according to claim 13, wherein a number of attachment points are formed on the first element, to which attachment points the second element is attachable using a number of attachment screws.

* * * * *